(12) United States Patent
Schmidt et al.

(10) Patent No.: US 8,120,653 B2
(45) Date of Patent: Feb. 21, 2012

(54) VIDEO MONITORING SYSTEM FOR SCHOOL BUSES

(75) Inventors: William P. Schmidt, Newport, MI (US); Daniel M. Swain, Wyandotte, MI (US)

(73) Assignee: Mirror Lite, Rockwood, MI (US)

( * ) Notice: Subject to any disclaimer, the term of this patent is extended or adjusted under 35 U.S.C. 154(b) by 1301 days.

(21) Appl. No.: 11/617,912

(22) Filed: Dec. 29, 2006

(65) Prior Publication Data
US 2008/0158352 A1   Jul. 3, 2008

(51) Int. Cl.
*H04N 7/00* (2006.01)
*H04N 7/18* (2006.01)

(52) U.S. Cl. .................. 348/118; 348/148; 348/159

(58) Field of Classification Search .................. None
See application file for complete search history.

(56) References Cited

U.S. PATENT DOCUMENTS

| | | | | |
|---|---|---|---|---|
| 5,027,200 | A * | 6/1991 | Petrossian et al. | 348/118 |
| 5,570,127 | A * | 10/1996 | Schmidt | 348/148 |
| 5,589,984 | A * | 12/1996 | Schmidt et al. | 359/603 |
| 5,793,420 | A * | 8/1998 | Schmidt | 348/148 |
| 6,227,674 | B1 * | 5/2001 | Englander | 359/853 |
| 6,738,089 | B1 * | 5/2004 | Silc | 348/148 |
| 6,989,736 | B2 * | 1/2006 | Berberich et al. | 340/425.5 |
| 7,446,650 | B2 * | 11/2008 | Scholfield et al. | 340/438 |
| 7,812,711 | B2 * | 10/2010 | Brown et al. | 340/426.18 |

* cited by examiner

*Primary Examiner* — John B. Walsh
(74) *Attorney, Agent, or Firm* — John A. Artz; Dickinson Wright PLLC

(57) ABSTRACT

A video camera system for a school bus to replace one or more of the mirror systems typically utilized on school buses today. One or two cameras can be positioned on the sides of the school bus in place of the rearview mirrors presently utilized. A pair of cameras with wide-angle lenses can be positioned on the front fenders of the school bus to replace the cross view mirrors currently used today. One or more cameras can also be positioned on the rear of the school bus to display the environment immediately behind the school bus. Video monitors displaying the images from the cameras can be positioned in the cab of the school bus for viewing by the driver. The monitors from the cameras positioned on the sides of the school bus can be positioned on the A-pillars of the school bus approximately in the locations presently occupied by the rearview mirrors outside of the school bus. The monitors for the cross-view mirrors can be positioned on the dashboard or instrument panel of the school bus, preferably to the right side of the driver and adjacent the egress door. The monitor for the camera(s) on the rear of the bus can be positioned on the windshield of the vehicle. A portable computer could also be provided in place of the stationary monitors, and a central recording system can be utilized to retain the images from all of the cameras for subsequent monitoring purposes.

11 Claims, 2 Drawing Sheets

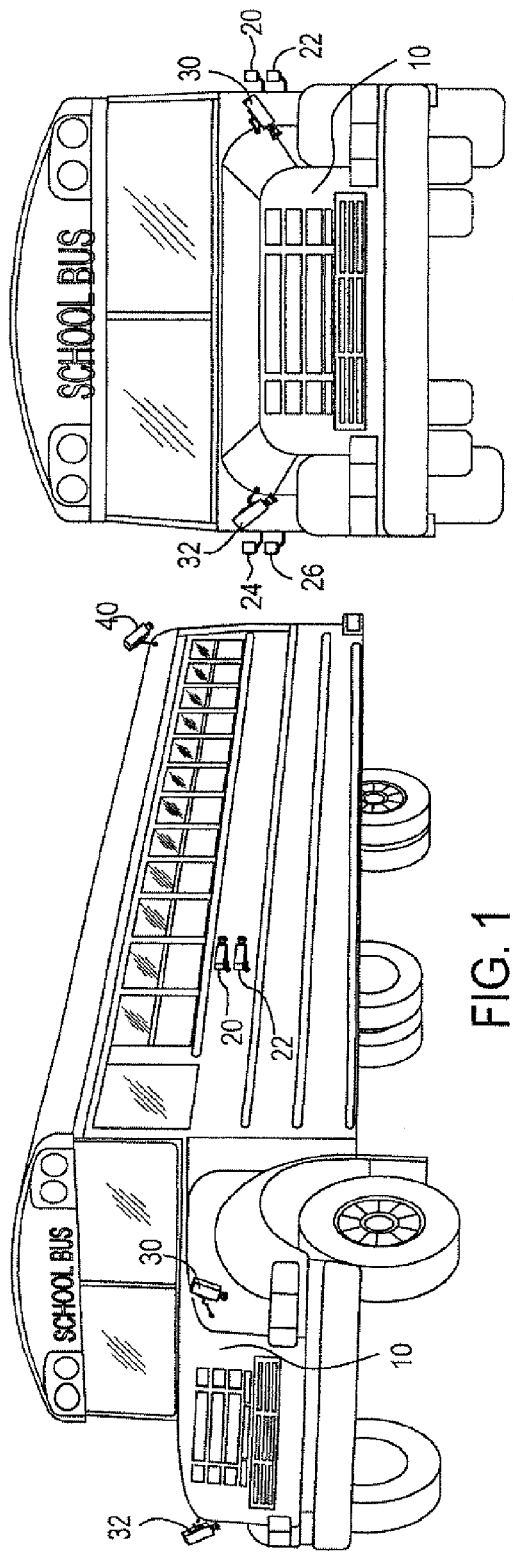
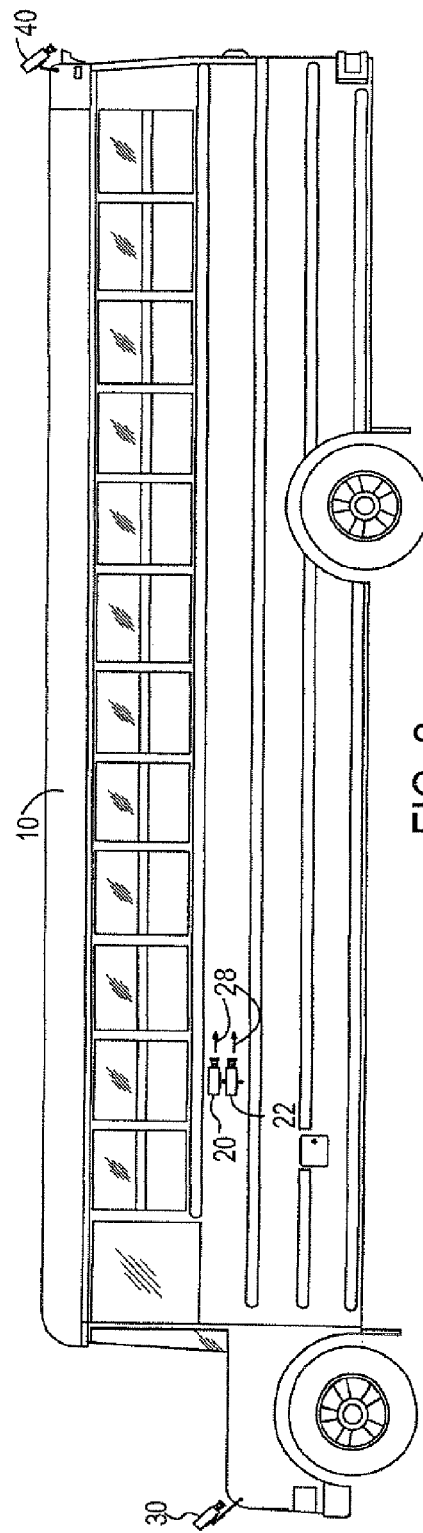

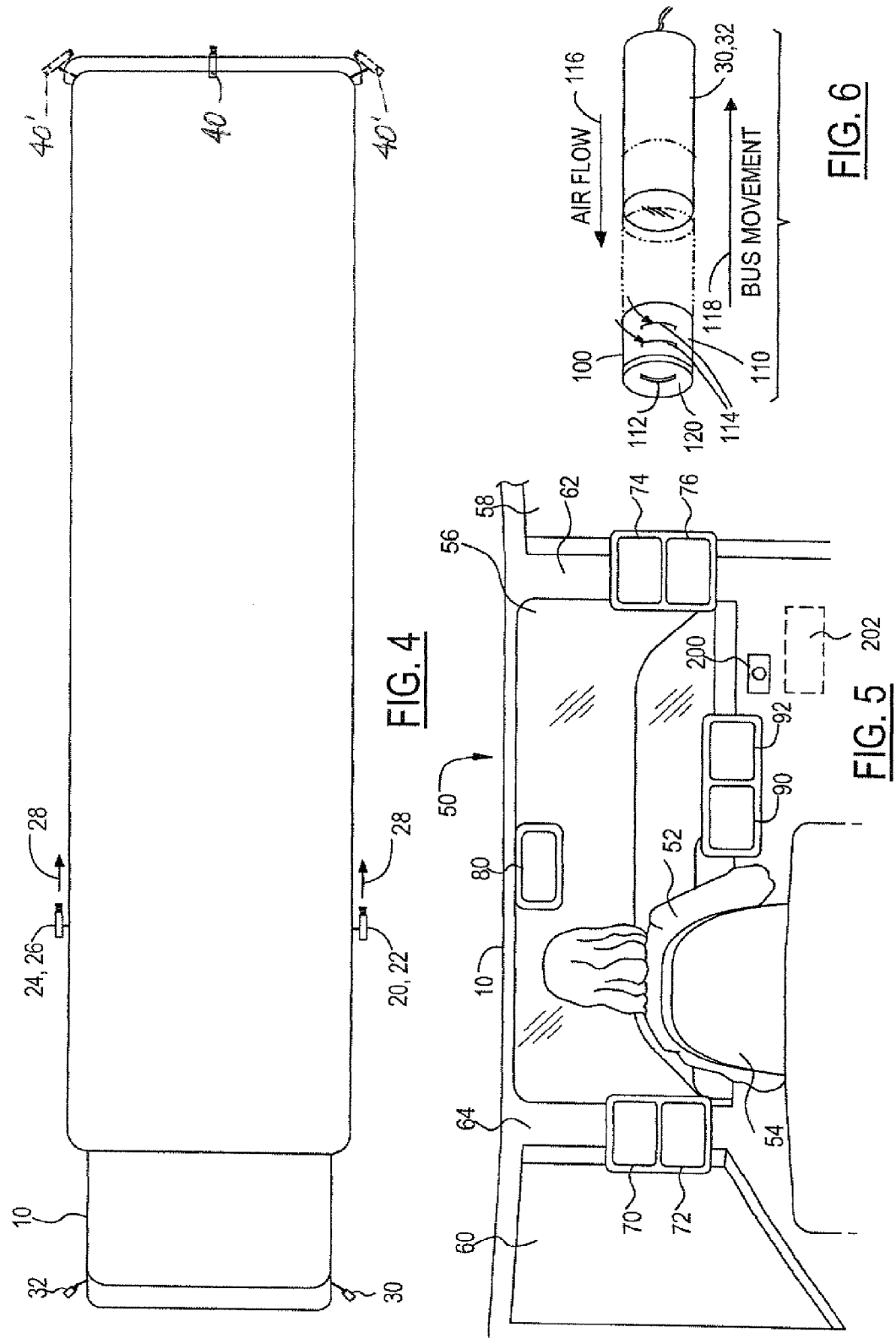

VIDEO MONITORING SYSTEM FOR SCHOOL BUSES

TECHNICAL FIELD

The present invention relates generally to video monitoring systems and more particularly to video monitoring systems for school buses.

BACKGROUND OF THE INVENTION

School buses are presently equipped with a variety of mirrors for use in assisting the driver to view surroundings and the situation around all areas of the bus. Presently, one or more rear view mirrors are positioned on each side of the school buses so that the driver can view the situation along the sides of the school bus and in the distance behind the school bus. In addition, school buses are provided in their front forward corners with cross-view mirrors. Cross-view mirrors are generally convex in shape and provide the driver with a field of view in the front of the bus and along the sides of the bus so that the driver can see children crossing in front of the bus and walking along the sides of the bus.

When the bus is moving, the driver uses the two side view mirrors in the same manner that the driver's use rearview mirrors on passenger cars. Also, in some buses, a centrally located rearview mirror located inside the bus is utilized to view the situation immediately behind the bus. The cross-view mirrors are utilized by the bus drivers when the vehicle is stopped and passengers are loading and unloading. All of those mirrors are relatively large in size and create blind spots obstructing the driver's view in one manner or another.

Improved systems for allowing the bus drivers to view the situation and environment around the bus are needed.

SUMMARY OF THE INVENTION

The present invention provides a unique and improved system which eliminates some blind spots for bus drivers and allows them to view their surroundings immediately adjacent all sides of the bus in a better manner. One or more video cameras are positioned on each side of the bus as replacements for the rearview mirrors typically utilized today. Preferably, two cameras are provided on each side of the bus, one representing a flat mirror and the other representing a convex mirror as typical with school buses today. A standard flat lens is utilized on the first camera, while a wide-angle convex lens is utilized on the second camera. The monitors for the outside cameras are positioned on the A-pillars inside of the bus in a position approximately where the bus driver would normally look to view his rear view mirrors.

A pair of video cameras are also mounted on the two front fenders of the school bus in place of the cross-view mirrors. These video cameras preferably have convex or fish-eye type lenses in order to replicate the field of view of a cross-view mirror. A monitor positioned centrally on the dashboard of the school bus will display the images produced by the cameras on the front fenders of the bus. Preferably, a pair of side by side monitors or a single monitor with a split screen can be utilized.

Also, in order for the driver to view the situation immediately behind the bus, one or two video cameras can be is positioned on the rear of the bus, preferably adjacent the roofline. The cameras positioned on the rear of the bus preferably have wide angle lenses in order to provide as much of a view of the situation behind the bus as possible. The monitor displaying the information from the video camera on the back of the bus can be positioned inside the school bus in a position normally occupied by a central rear view mirror.

In addition, airfoil/venturi members are preferably positioned adjacent some of the camera lenses, particularly on the "cross-view" cameras on the front of the bus in order to aid in keeping the lenses free from dirt and other debris from the road and/or environmental conditions.

The present invention will be more clearly understood with reference to the accompanying drawings. Other benefits, features, and aspects of the invention will become apparent from the following written description of the invention when viewed in accordance with the attached drawings and appended claims.

BRIEF DESCRIPTION OF THE DRAWINGS

FIG. 1 is a schematic illustration of a school bus illustrating the use of video cameras in accordance with the present invention.

FIG. 2 is a side view of the school bus as shown in FIG. 1.

FIG. 3 is a front view of the school bus as shown in FIGS. 1 and 2.

FIG. 4 is a top view of the school bus as shown in FIGS. 1-3.

FIG. 5 is a schematic illustration of a bus cabin depicting the position of the monitors for the various cameras on the outside of the school bus.

FIG. 6 illustrates the use of an airfoil/venturi member utilized with a video camera in accordance with one embodiment of the present invention.

DETAILED DESCRIPTION OF THE PREFERRED EMBODIMENTS

School buses today have their variety of mirrors that the drivers utilize to view the situations inside and outside of the vehicles, whether the school bus is moving or stationary. These mirrors allow the driver to view the surrounding situation and environment. Many of these mirrors, however, particularly the mirrors positioned on the sides of the school buses and on the front fenders, can create blind spots in the visibility of the drivers.

With the present invention, the mirrors typically utilized on the outside of the school bus are replaced by video cameras and the displays are shown in a plurality of monitors positioned at strategic locations inside the school bus. The cameras are mounted in non-obtrusive locations in order to allow increased visibility of the driver to the outside environment. The monitors inside the school bus can be positioned in locations that the driver is accustomed to looking at the outside mirrors so the drivers can easily switch from a school bus with mirrors to a school bus with video cameras.

As shown in FIGS. 1-4, a representative school bus is schematically shown and indicated by the reference numeral 10. FIG. 1 is a perspective view of the school bus; FIG. 2 is a side view of the school bus; FIG. 3 is a front view of the school bus; and FIG. 4 is a top view of the school bus.

The present invention utilizes a plurality of video cameras on the exterior of the school bus. As shown in FIGS. 1-4, pairs of video cameras 20, 22 and 24, 26 are positioned on each side of the school bus and replace the set of rear view mirrors typically utilized on school buses today. In addition, a pair of video cameras 30 and 32 are positioned on the right and left front fenders of the school bus. In addition, at least one video camera 40 is positioned on the rear of the school bus in order to allow the driver to view the situation immediately behind the bus.

The video cameras can be any of the conventional types of video cameras known today. In this regard, although the cameras illustrated in the drawings appear to be smaller versions of consumer video cameras, the actual video cameras preferred for use with the present invention are smaller and less intrusive. Video cameras on the order of ¾ inch in diameter and 2-3 inches in length are preferred, such as shown in FIG. 6. Video cameras of this type are in common use today in many applications. Also, cameras of this size will not block the view of the driver in any direction, as currently exists with large cross-view mirrors and large rear view mirrors.

The lenses for the video cameras can be conventional, although some are specially made to provide the fields of view which are required at certain locations. One of the pairs of video cameras on each side of the school bus, namely cameras 20 and 24, replace the flat mirrors which are typically utilized on the sides of school buses, as well as most other vehicles on the road today. Conventional flat lenses are utilized on these cameras. The second pair of video cameras on each side of the school buses, namely cameras 22 and 26, have wide-angle lenses which replace the convex rear view mirrors currently provided on school buses.

The two sets of cameras on each side of the school bus are positioned so that they view rearwardly toward the rear of the school bus. These are represented by arrows 28 as shown in FIGS. 2 and 4. The cameras with flat lenses provide a straight view rearwardly while the wide-angle lenses provide a wider field of view allowing the drivers to see objects at a greater distance from the sides of the bus.

Although two cameras are illustrated positioned on each side of the school bus, it is also possible to provide only a single camera on each side of the bus.

The cameras 30 and 32 positioned on the front fenders of the school bus have special lens replicating the fields of view currently provided by cross-view mirrors. Since these cameras are replacing the convex-type cross-view mirrors utilized on school buses today, it is preferred that the camera lenses provide a wide field of view allowing viewing along the front of the bus as well as part of the sides of the bus (up to at least the cameras 20, 22, 24, and 26 positioned on the sides of the buses).

The cross-view cameras 30 and 32 are also positioned by bracket and supporting arm members such that they extend past the front of the bus and beyond the sides of the bus and point in a direction back toward the front corners of the buses in order to provide the requisite fields of view.

In order to keep the lenses on the cameras from being covered with dirt and other road debris, a self-cleaning member is provided adjacent the camera lenses. This is preferably placed on the cross-view cameras on the front of the school bus. The self-cleaning members are airfoil/venturi-type members which direct air to pass through them increase in velocity, and keep the lenses cleaner. The air with increased velocity is directed against the lenses ill order to prevent them from being covered with dust and other debris, and to clean off any settled debris.

At the rear of the bus 10, one or more cameras 40 are also provided. One camera positioned in the middle of the rear of the bus preferably is provided. It is also possible alternatively to provide a pair of cameras 40' at the two corners as shown in FIG. 4 in hidden lines.

FIG. 5 is a schematic view of the cab portion of a school bus, the cab portion being indicated by the reference numeral 50. The driver 52 is shown sitting in a driver's seat 54 and looking in a direction toward the front window or windshield 56 of the school bus 10. A pair of side windows 58 and 60 are also shown in FIG. 5. The portions of the school bus 10 between the front windshield 56 and the side windows 58 and 60 are known as the A-pillars of the vehicle. These are indicated by the reference numerals 62 and 64. Virtually all vehicles have an A-pillar of some type.

A pair of video monitors 70 and 72 are positioned on the front left A-pillar 64. The monitors 70 and 72 are used to display the images provided by cameras 20 and 22, respectively, which are positioned outside the school bus and on the same side of the bus.

In a similar manner, video monitors 74 and 76 are positioned on the right front A-pillar 62 of the bus. The monitors 74 and 76 display the images provided by the cameras 24 and 26, respectively, which are positioned on the corresponding left outside surface of the school bus, as shown.

The monitors 70, 72 and 74, 76 can comprise two sets of two monitors. Alternatively, only one monitor with a split screen on each A-pillar can be provided. Also, if only a single video camera is positioned on each side of the school bus, then only a single monitor needs to be positioned on each of the A-pillars.

As shown, the positions of the monitors 70, 72, and 74, 76 are as close as possible to the locations where the drivers would ordinarily view the rearview mirrors positioned on school buses today, as well as other vehicles. Thus, for the drivers to view these monitors, this would be basically the same as a driver viewing rear view mirrors today.

A video monitor 80 is provided to display the images provided by the camera 40 on the rear of the bus. As shown in FIG. 5, the monitor 80 is positioned approximately in a location where a central rearview mirror would be positioned on a traditional automobile or other vehicle. The monitor 80 could also be positioned in any other convenient location. Thus, with the video camera (or cameras) 40, the driver can view the situation immediately behind the bus.

Video monitors for the cross-view cameras are provided on the dashboard of the vehicle and illustrated by the reference numerals 90 and 92. As indicated above, the cross-view mirrors are typically viewed by the driver when the bus is stopped and children are getting on or off the bus. The monitors 90, 92 are preferably positioned on the right half of the instrument panel in a direction toward the egress door (not shown) which is typically positioned on school buses on the right side of the driver. Thus, the driver can view the images from the cross-view cameras 30 and 32 on the monitors 90, 92 at the same time he is viewing the children getting on and off the bus through the primary egess door. Again, one monitor with a split screen can be provided instead of a pair of separate monitors 90 and 92.

A cleaning airfoil/venturi member 100 used to prevent a buildup of dust and other debris on the camera lenses is shown in FIG. 6. In FIG. 6, the video camera itself is referred to by the reference numerals 30 and 32 since the cleaning member 100 is preferably used with the cross-view cameras on the front corners of the bus. The airfoil/venturi member 100 is preferably a hollow tube 110 with a series of slits or aperatures 112 in the sides thereof. Louver-types flanges 114 on the member 100 direct air from the air stream 116 which is caused by the movement of the bus in the direction of arrow 118. The member 100 is positioned over or on the end of the cameras 30, 32 as indicated. The member 100 acts like a venturi and increases the velocity of the air passing into the hollow interior 120 of the tube. This provides a stream of air which is diverted toward the lenses of the cameras to help keep them clean and free of dirt and other debris.

Other forms or structures of an air deflector could be used to redirect a portion of the airflow 116 across the front of the lens to help keep it cleaner. For example, a partial tube, a series of individual deflectors, or the like could be utilized.

Rather than providing monitors mounted inside the bus as shown, an outlet port 200 can be provided on the bus for connection to a laptop or other portable computer. The outlet port is preferably provided on the dashboard of the bus. In this manner, the driver can monitor the fields of view from the front cross-view cameras in an easier and more versatile manner.

A stand or shelf (not shown) could also be provided adjacent the driver for positioning of the portable computer. In an alternate embodiment, a laptop or portable computer could be utilized along with the stationary monitors described above.

A portable computer or other central computer could also be utilized for recording and maintaining the records of the movements and activities of the bus as it is being utilized in the field. The images from all of the video cameras located outside the bus could be directed to a central computer (e.g. to a portable computer through the outport port 200) which would record all of the daily activities of the bus. This computer video storage member, illustrated schematically by box 202 in FIG. 5, would then act in the same manner as the "Black Box" used on commercial airplanes today. The video storage member 202 could be used to determine the cause of any accidents in which the bus might be involved, or to simply monitor the driving skills and habits of the drivers. In the latter situation, the video storage members could be utilized to weed out unsafe or unworthy bus drivers creating a safer and better environment for the passengers on the bus.

In an alternate embodiment, video cameras can be provided only on the front fenders of the buses replacing the cross-view mirrors currently in use today. Conventional rear-view mirrors would remain on the sides of the buses. The cross-view cameras would have lenses replicating the fields of view of current cross-view mirrors or provide improved wider and clearer fields of view.

In this alternate embodiment, the monitor or monitors (i.e. two separate monitors or one with a split screen) would be positioned on the dashboard, such as at monitors 90, 92 shown in FIG. 5. The monitors could also be positioned on one of the A-pillars. A laptop or other portable computer (as discussed above and preferably connected through outlet port 200) could also be utilized instead.

The lenses on the cross-view cameras should provide fields of view at least as good as the oval convex cross-view mirrors in use today. These cross-view mirrors typically have radii of curvature which decrease in some manner along their major axes from the center of the lens to the perimeters. An example of such lenses are shown in U.S. Pat. No. 5,589,984, the disclosure of which is hereby incorporated by reference. The cross-view cameras could also have lenses replicating the fields of view of the constant radii cross-view mirrors as shown in U.S. Pat. No. 6,227,674. Preferably, however, the lenses on the cross-view cameras in accordance with the present invention have fields of view replicating fields of view provided by the convex cross-view mirror lenses disclosed in U.S. patent application Ser. No. 10/908,038, filed on Apr. 26, 2005, the disclosure of which is hereby incorporated by reference. In this regard, the fields of view from the camera lenses preferably reduce the size of the image of the bus itself and enlarge the images of the environment and surroundings outside the bus. This makes it easier to spot children and other items which might otherwise not be so easily noticed or observed.

While particular embodiments of the invention have been shown and described, numerous variations and alternative embodiments will occur to those skilled in the arm. Accordingly, it is intended that the invention be limited only in terms of the appended claims.

What is claimed is:

1. A video camera system for school buses comprising:
   at least one first video camera positioned on each side of the school bus for displaying images in a rearward direction along the sides of the bus;
   a pair of cross-view video cameras positioned on each of the front fenders of the school bus for displaying images at least along the front of the bus;
   a first monitor positioned on a first A-pillar of the school bus for displaying images from one of said first video cameras;
   a second monitor positioned on a second A-pillar of the school bus for displaying images from the other of said first video cameras;
   at least one third monitor for displaying images from at least one of said cross-view cameras, said third monitor positioned on the dashboard of the school bus.

2. A video camera system as described in claim 1, wherein a pair of first video cameras are provided on each of the two sides of the school bus.

3. A video camera system as described in claim 2 wherein a pair of monitors or a split screen monitor is positioned on each of the two A-pillars of the school bus for displaying images from said first and second video camera.

4. A video camera system as described in claim 1 wherein said third monitor is a split screen monitor.

5. A video camera system as described in claim 1 wherein two third monitors are provided for displaying images from said cross-view video cameras.

6. A video camera system as described in claim 1 further comprising at least one second video camera positioned on the rear of the school bus for providing images of the area immediately behind the school bus.

7. A video camera system as described in claim 6 further comprising at least one fourth monitor positioned inside the school bus for displaying images from said second video camera.

8. A video camera system as described in claim 1 further comprising at least one cleaning member for increasing the velocity of the air and directing: it against the camera lenses.

9. The video camera system as described in claim 8 wherein a cleaning member is provided adjacent each of the lenses of said pair of cross-view video cameras.

10. The video camera system as described in claim 1 further comprising a video recording; member for recording and retaining the images displayed from at least one of the video cameras, wherein the images recorded from the activities of the bus can be later monitored.

11. The video camera system as described in claim 1 further comprising an outport port in the bus for connection to a portable computer.

* * * * *